US012749910B2

(12) United States Patent
Yoshiaki et al.

(10) Patent No.: US 12,749,910 B2
(45) Date of Patent: Sep. 29, 2026

(54) METHOD OF CONTROLLING STATE OF CHARGE (SOC) OF BATTERY, APPARATUS FOR CONTROLLING SOC OF BATTERY, AND RECORDING MEDIUM HAVING STORED THEREIN COMPUTER PROGRAM TO EXECUTE THE METHOD

(71) Applicant: Samsung SDI Co., Ltd., Yongin-si (KR)

(72) Inventors: Okui Yoshiaki, Yongin-si (KR); Jaebum Kim, Yongin-si (KR); Sukki Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 836 days.

(21) Appl. No.: 18/093,300

(22) Filed: Jan. 4, 2023

(65) Prior Publication Data

US 2023/0216325 A1 Jul. 6, 2023

(30) Foreign Application Priority Data

Jan. 6, 2022 (KR) ........................ 10-2022-0002162

(51) Int. Cl.
*H02J 7/90* (2026.01)
*H01M 10/42* (2006.01)
(Continued)

(52) U.S. Cl.
CPC ........... *H02J 7/933* (2026.01); *H01M 10/441* (2013.01); *H02J 7/342* (2020.01); *H02J 7/52* (2026.01);
(Continued)

(58) Field of Classification Search
CPC .... H02J 7/00712; H02J 7/0014; H02J 7/0048; H02J 7/007182; H02J 7/342; H02J 2207/20; H01M 10/441; H01M 2010/4271
(Continued)

(56) References Cited

U.S. PATENT DOCUMENTS 9,209,639 B2 12/2015 Nishikawa et al.
9,800,064 B2 10/2017 Hwang et al.
(Continued)

FOREIGN PATENT DOCUMENTS

CN 103918120 A 7/2014
JP 2011-61955 A 3/2011
(Continued)

OTHER PUBLICATIONS

EPO Extended European Search Report dated May 12, 2023, issued in corresponding European Patent Application No. 23150566.0 (7 pages).
(Continued)

*Primary Examiner* — Julian D Huffman
*Assistant Examiner* — Nathan J Instone
(74) *Attorney, Agent, or Firm* — Womble Bond Dickinson (US) LLP

(57) ABSTRACT

A method of controlling state of charge (SOC) of a first battery and a second battery that are connected in parallel with each other, includes: calculating the SOC of the first battery and the SOC of the second battery; controlling output voltage command values of a first direct current (DC-DC) converter and a second DC-DC converter based on the SOC of the first battery and the SOC of the second battery, the first DC-DC converter and the second DC-DC converter being connected to ends of the first battery and the second battery, respectively; and controlling the SOC of the
(Continued)

first battery and the SOC of the second battery based on the controlling of the output voltage command values of the first DC-DC converter and the second DC-DC converter.

7 Claims, 12 Drawing Sheets

(51) Int. Cl.
*H01M 10/44* (2006.01)
*H02J 7/34* (2006.01)
*H02J 7/52* (2026.01)
*H02J 7/56* (2026.01)
*H02J 7/82* (2026.01)
*H02J 7/96* (2026.01)

(52) U.S. Cl.
CPC .................................... *H02J 7/56* (2026.01); *H02J 7/82* (2026.01); *H02J 7/96* (2026.01); *H01M 2010/4271* (2013.01); *H02J 2207/20* (2020.01)

(58) Field of Classification Search
USPC ........................................................ 320/126
See application file for complete search history.

(56) References Cited

U.S. PATENT DOCUMENTS

| | | | |
|---|---|---|---|
| 10,938,221 | B1 | 3/2021 | Tenorio |
| 11,509,153 | B2 | 11/2022 | Alipoor et al. |
| 2011/0313613 | A1 | 12/2011 | Kawahara et al. |
| 2014/0239900 | A1 | 8/2014 | Abe et al. |
| 2015/0194707 | A1 | 7/2015 | Park |
| 2021/0151997 | A1 | 5/2021 | Henke et al. |
| 2021/0399352 | A1 | 12/2021 | Kamel Ahmed et al. |

FOREIGN PATENT DOCUMENTS

| | | | | |
|---|---|---|---|---|
| JP | 2013-38960 | A | | 2/2013 |
| JP | 2013038960 | A | * | 2/2013 |
| JP | 2019140716 | A | * | 8/2019 |
| JP | 2021-93804 | A | | 6/2021 |
| KR | 10-2021-0058660 | A | | 5/2021 |
| KR | 10-2255491 | B1 | | 5/2021 |
| KR | 10-2256301 | B1 | | 5/2021 |
| WO | WO 2014/010176 | A1 | | 1/2014 |

OTHER PUBLICATIONS

Japanese Office Action issued in corresponding JP Application No. 2023-000662, dated Jan. 9, 2024, 4 pages.
Chinese Office Action corresponding to CN Application No. 202310008368.1, dated May 26, 2026 (7 pages).

* cited by examiner

METHOD OF CONTROLLING STATE OF CHARGE (SOC) OF BATTERY, APPARATUS FOR CONTROLLING SOC OF BATTERY, AND RECORDING MEDIUM HAVING STORED THEREIN COMPUTER PROGRAM TO EXECUTE THE METHOD

CROSS-REFERENCE TO RELATED APPLICATION

This application claims priority to and the benefit of Korean Patent Application No. 10-2022-0002162, filed on Jan. 6, 2022, in the Korean Intellectual Property Office, the entire content of which is incorporated by reference herein.

BACKGROUND

1. Field

Aspects of embodiments of the present disclosure relate to a method of controlling the state of charge (SOC) of a battery, an apparatus for controlling the SOC of a battery, and in a recording medium having stored therein a computer program to execute the method.

2. Description of the Related Art

In recent years, as the demand for portable electronic products has rapidly increased, such as for laptops, video cameras, mobile phones, and/or the like, and developments on energy storage batteries, robots, satellites and/or the like have been intensified, research on high-performance secondary batteries capable of being repeatedly charged and discharged has been actively conducted.

Currently commercialized secondary batteries include nickel cadmium batteries, nickel hydrogen batteries, nickel zinc batteries, and lithium secondary batteries. From among the secondary batteries, the lithium secondary batteries have gained the most attention due to their ability of being able to be freely charged and discharged without producing a large memory effect, having very low self-discharge, and having high energy density, when compared to the nickel-based secondary batteries.

The above information disclosed in this Background section is for enhancement of understanding of the background of the present disclosure, and therefore, it may contain information that does not constitute prior art.

SUMMARY

A battery including the secondary battery may be used in various suitable mobility devices, such as automobiles. When a battery is charged or discharged by using a parallel battery system, in which a plurality of batteries are connected in parallel with each other, the charging and discharging of the entire parallel battery system may be stopped due to a battery that reaches a state of charge (SOC) of 0% or 100% first from among the plurality of batteries. In this case, because the SOC balance of each battery may be different from those of the others, and unused residual energy may become large, the battery capacity thereof may not be fully used.

Embodiments of the present disclosure are directed to a method of controlling the state of charge (SOC) of a battery, and more particularly, to a method capable of effectively controlling the SOC of a battery in a process of charging and discharging a secondary battery, an apparatus for controlling the SOC of a battery, and a recording medium having stored therein a computer program to execute the method.

However, the aspects and features of the present disclosure are not limited thereto.

Additional aspects and features will be set forth, in part, in the description that follows, and in part, will be apparent from the description, or may be learned by practicing one or more of the presented embodiments of the present disclosure.

According to one or more embodiments of the present disclosure, a method of controlling state of charge (SOC) of a first battery and a second battery that are connected in parallel with each other, includes: calculating the SOC of the first battery and the SOC of the second battery; controlling output voltage command values of a first direct current (DC-DC) converter and a second DC-DC converter based on the SOC of the first battery and the SOC of the second battery, the first DC-DC converter and the second DC-DC converter being connected to ends of the first battery and the second battery, respectively; and controlling the SOC of the first battery and the SOC of the second battery based on the controlling of the output voltage command values of the first DC-DC converter and the second DC-DC converter.

In an embodiment, the controlling of the SOC of the first battery and the SOC of the second battery may include: performing an SOC average control operation by amplifying a difference between an average SOC of the first battery and the second battery and the SOC of the first battery or the SOC of the second battery; and performing an excess component output operation to output an excess value by comparing an SOC limit value of the first battery and the second battery with the SOC of the first battery or the second battery.

In an embodiment, the controlling of the SOC of the first battery and the SOC of the second battery may further include performing an SOC limit value control operation by outputting a value obtained by multiplying the excess value output by the excess component output operation by a signal before amplification by the SOC average control operation.

In an embodiment, the SOC limit value control operation may be performed by controlling an analog circuit or a digital circuit.

In an embodiment, the controlling of the SOC of the first battery and the SOC of the second battery may further include controlling the SOCs of the first battery and the second battery by subtracting a difference between the output value of the SOC average control operation and the SOC limit value by output voltage command values of the first DC-DC converter and the second DC-DC converter, respectively.

In an embodiment, the method may be executed on a computer device according to a computer program stored on a recording medium.

According to one or more embodiments of the present disclosure, an apparatus for controlling a state of charge (SOC) of a battery, includes: a processor; and memory including instructions that, when executed by the processor, cause the processor to: calculate the SOC of a first battery and the SOC of a second battery that are connected in parallel with each other; and control output voltage command values of a first direct current (DC-DC) converter and a second DC-DC converter based on the SOC of the first battery and the SOC of the second battery, respectively, the first DC-DC converter and the second DC-DC converter being electrically connected to ends of the first battery and the second battery, respectively. The SOC of the first battery and the SOC of the second battery are controlled based on the the controlled output voltage command values of the first DC-DC converter and the second DC-DC converter.

In an embodiment, the processor may include: an SOC average control circuit configured to amplify a difference between an average SOC of the first battery and the second battery and the SOC of the first battery or the SOC of the second battery; and an excess component output circuit configured to compare an SOC limit value of the first battery and the second battery with the SOC of the first battery or the second battery to output an excess value.

In an embodiment, the processor may further include an SOC limit value control circuit configured to output a value obtained by multiplying the excess value output by the excess component output circuit by a signal before amplification by the SOC average control circuit.

In an embodiment, the SOC limit value control circuit may include an analog circuit or a digital circuit.

In an embodiment, the instructions may further cause the processor to control the SOCs of the first battery and the second battery by subtracting a difference between the output value of the SOC average control circuit and the output value of the SOC limit value control circuit by the controlled output voltage command values of the first DC-DC converter and the second DC-DC converter, respectively.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Figure 1:
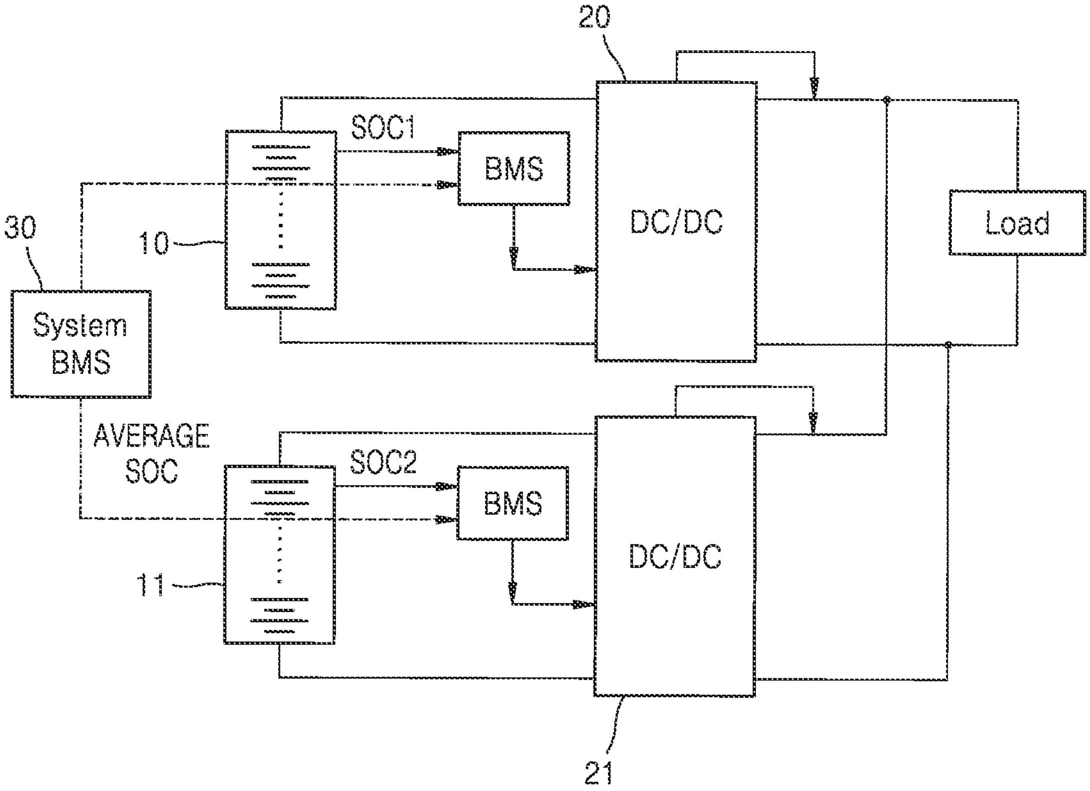
FIG. 1 schematically illustrates an apparatus for controlling the state of charge (SOC) of a battery, the battery, a direct current (DC)-DC converter, and the like, according to an embodiment.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Embodiments of the present disclosure may be described in terms of functional block components and various processing steps. Such functional blocks may be realized by any suitable hardware and/or software components that are configured to perform the specified functions. For example, the functional blocks may be implemented with at least one micro-processor and/or integrated circuit configurations for some of the specified functions. The functional blocks may be implemented in various programming and/or scripting languages. The functional blocks may be implemented as an algorithm executed on one or more processors. Functions performed by a functional block may be performed by a plurality of functional blocks, or functions performed by the plurality functional blocks may be performed by one functional block. Furthermore, embodiments of the present disclosure may employ any suitable number of techniques for electronics configurations, signal processing and/or control, data processing, and/or the like.

The electronic or electric devices and/or any other relevant devices or components according to embodiments of the present disclosure described herein (e.g., the apparatus for controlling the SOC of the battery, the communication module, the processor, the SOC average control circuit, the excess component output circuit, the SOC limit value control circuit, and the like) may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
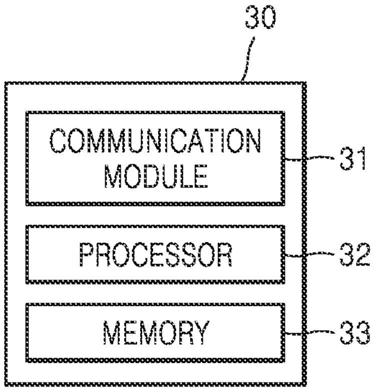
FIG. 2 is a block diagram schematically illustrating various components of the apparatus for controlling the SOC of a battery illustrated in FIG. 1.

FIG. 1 schematically illustrates an apparatus for controlling the state of charge (SOC) of a battery, the battery, a direct current (DC)-DC converter, and the like, according to an embodiment. FIG. 2 is a block diagram schematically illustrating various components of the apparatus for controlling the SOC of a battery illustrated in FIG. 1. For example, referring to FIG. 1, the apparatus for controlling the SOC of a battery according to an embodiment may represent a system battery management system (BMS) 30. As another example, the apparatus for controlling the SOC of a battery according to an embodiment may represent the system BMS 30, and a BMS included in each battery rack.

Referring to FIGS. 1 and 2, the system BMS 30 according to an embodiment may be electrically connected to a first DC-DC (direct current) converter 20 and a second DC-DC converter 21, which may be electrically connected to ends of a first battery 10 and a second battery 11, respectively. The system BMS 30 may control the SOC of the first battery 10 and the second battery 11, by controlling the first DC-DC converter 20 and the second DC-DC converter 21, respectively. In some embodiments, as shown in FIG. 1, a BMS may be provided in each battery rack. Each BMS may estimate the SOC of a corresponding battery. In addition, each BMS may be electrically connected to a corresponding DC-DC converter to control the corresponding DC-DC converter.

Each battery rack may transmit and receive SOC information to calculate an average SOC. For example, the system BMS 30 may communicate with the BMS of each battery rack to calculate an average SOC. Also, the system BMS 30 may transmit information about the average SOC to the BMS of each battery rack.

As shown in FIG. 1, the BMS is distributed and arranged for each battery rack, so that a probability of stopping an entire system may be reduced (e.g., lowered) as compared to a case in which only one master BMS is arranged. Also, when an amount of interface (I/F) information is large, and the number of racks is large, the number of battery racks that may be connected in parallel with each other may be limited due to control speed restrictions, and thus, according to an embodiment, the BMS may be distributed and arranged for each battery rack. Also, the BMSs may be distributed and arranged in two rows as shown in FIG. 1, as well as in a plurality of racks of three or more rows.

Each of the first battery 10 and the second battery 11 includes at least one battery cell, and the battery cell may be a rechargeable secondary battery. For example, the battery cell may include at least one selected from the group consisting of a nickel-cadmium battery, a lead acid battery, a nickel metal hydride battery (NiMH), a lithium ion battery, and a lithium polymer battery, but the present disclosure is not limited thereto. As another example, the battery cell may include at least one of a nickel-cadmium battery, a lead acid battery, a nickel metal hydride battery (NiMH), a lithium ion battery, a lithium polymer battery, or the like.

The number and connection methods of the battery cells included in each of the first battery 10 and the second battery 11 may be determined based on a desired amount of power and voltage used from a battery pack. Although FIG. 1 illustrates the battery cells included in the first battery 10 and the second battery 11 are connected in series, the present disclosure is not limited thereto, and the battery cells may be connected in parallel with each other, or may be connected in series and in parallel. In some embodiments, each of the first battery 10 and the second battery 11 may include only one battery cell. In some embodiments, each of the first battery 10 and the second battery 11 may include a plurality of battery modules, each configured with a plurality of battery cells. In addition, a battery SOC control system may include a switch, a battery protection circuit, a fuse, a current sensor, a temperature sensor, or the like, in addition to the apparatus for controlling the SOC of a battery.

The battery SOC control system according to an embodiment of the present disclosure may include a plurality of DC-DC converters. For example, the battery SOC control system may include the first DC-DC converter 20 and the second DC-DC converter 21. The DC-DC converter is a power converter that receives DC input power, and converts the received DC input power into DC power in a form used by an output side load to output the converted DC power. For example, as shown in FIG. 1, the first DC-DC converter 20 and the second DC-DC converter 21 may be electrically connected to ends of the first battery 10 and the second battery 11, respectively. Also, the first DC-DC converter 20 and the second DC-DC converter 21 may each supply and output an output voltage to a load.

The first DC-DC converter 20 and the second DC-DC converter 21 may control opposite link voltages of the first battery 10 and the second battery 11, respectively. For example, the link voltages output by the first DC-DC converter 20 and the second DC-DC converter 21 may be controlled to be constant or substantially constant. In addition, battery charge/discharge power is determined according to a load state of a load connected to a DC-DC converter link. Because the link voltage may be constant or substantially constant, a current having a current value obtained by diving load power by the link voltage flows through the load. For example, when the load is 1 megawatts (MW), and the link voltage is controlled to 1000V by a DC-DC converter, 1000 A current flows in the link. Also, in the case of the battery racks in two rows, when impedances (e.g., DC/DC+ battery impedance) of the respective racks are 100 milliohms (mΩ) and 150 mΩ, 600 A and 400 A flow, respectively. However, when charging and discharging are continued in such a state, 100 mΩ may be charged and discharged relatively more, and thus, the range of SOC fluctuations may become large.

According to one or more embodiments of the present disclosure, a charge/discharge amount may be controlled by changing an impedance of each rack based on the SOC of each battery rack. For example, because an impedance of a battery may be fixed, the impedance of a DC-DC converter may be changed. In this case, a link voltage may be kept constant or substantially constant. Thus, the impedance of the DC-DC converter may be determined according to a control gain that controls a link voltage. For example, when a value of the control gain is high, the impedance may be lowered, and when a value of the control gain is low, the impedance may be increased.

As such, a method of changing the impedance of a DC-DC converter according to the SOC of each battery may be provided according to one or more embodiments of the present disclosure. In addition, according to one or more embodiments of the present disclosure, when a difference in the SOC of each of the battery racks is large while the SOC of a battery is near 0% or near 100%, the SOC of each of the battery racks may be controlled to be the same or substantially the same as each other (e.g., to be almost identical to each other) by an SOC limit operation (e.g., an SOC threshold control), and thus, the SOC of all of the battery racks may be concurrently (e.g., simultaneously or substantially simultaneously) controlled with each other to be 0% or 100%. According to an embodiment of the present disclosure, load power may not be constant, and the SOC that frequently changes may be controlled to be the same or substantially the same (e.g., almost the same) as each other, even during charging and discharging, and thus, the SOC may be controlled to be matched with one another even when a difference in the SOC is large in the vicinity of the SOC of 0% and 100%. Accordingly, all the energy of the batteries arranged in parallel with each other may be used without wasting the energy.

The battery SOC control system according to an embodiment may include the system BMS 30, and the BMS included in each battery rack. For example, referring to FIG. 2, each of the system BMS 30 and the BMS included in each battery rack may include a communication module (e.g., a communication circuit) 31, a processor 32, and memory 33.

The processor 32 may control the first DC-DC converter 20 and/or the second DC-DC converter 21. For example, the processor 32 may control an output voltage command value of the first DC-DC converter 20 and/or the second DC-DC converter 21.

The processor 32 may be the BMS that controls the overall operation of the battery SOC control system. For example, the processor 32 may be implemented in the form of a general purpose processor, an application-specific integrated circuit (ASIC), other suitable chipsets, logic circuits, registers, communication modems, and/or data processing devices to perform an operation of the system BMS 30. In addition, the processor 32 may perform basic calculations, logic, and input/output operations, and may execute, for example, program code stored in memory. The processor 32 may store state information in the memory 33, or may load data stored in the memory 33.

The memory 33 is a recording medium readable by the processor 32, and may include a permanent mass storage device, such as random-access memory (RAM), read-only memory (ROM), and a disk drive. An operating system and at least one program or application code may be stored in the memory 33. Program code for a method of controlling the SOC of a battery according to an embodiment may be stored in the memory 33. Data generated by measuring at least one parameter of a battery being charged may be stored in the memory 33. For example, the data may include a charge/discharge current, a terminal voltage, and/or a temperature of the battery. Program code for estimating the SOC of a battery by using data generated by measuring at least one parameter of the battery, and SOC-open circuit voltage (OCV) data may be stored in the memory 33. The at least one parameter of the battery refers to a component or variable, such as a terminal voltage of the battery, a charge/discharge current, and/or an ambient temperature.

The system BMS 30 may further include the communication module 31. For example, as shown in FIG. 1, the first DC-DC converter 20 and the second DC-DC converter 21 may each transmit and receive data to and from the system BMS 30 by using the communication module 31. In addition, the first battery 10 and the second battery 11 may each transmit and receive data to and from the system BMS 30 by using the communication module 31 thereof. For example, the system BMS 30 may receive SOC data of each of the first battery 10 and the second battery 11. In addition, the system BMS 30 may transmit an output voltage command value control command to each of the first DC-DC converter 20 and the second DC-DC converter 21.

A communication method of the communication module 31 is not limited thereto, and may include short-range wireless communication between the devices, as well as a suitable communication method using a communication network that may include, for example, a mobile communication network, wired Internet, wireless Internet, and/or a broadcasting network. For example the network may include at least any one of various suitable networks, such as a personal area network (PAN), a local area network (LAN), a campus area network (CAN), a metropolitan area network (MAN), a wide area network (WAN), a broadband network (BBN), the Internet, or the like. In addition, the network may include at least any one of various suitable network topologies including a bus network, a star network, a ring network, a mesh network, a star-bus network, a tree or a hierarchical network, or the like.

The battery SOC control system according to an embodiment of the present disclosure may include an input/output interface. The input/output interface may be a unit (e.g., a device, a component, a terminal, a circuit, or the like) for interfacing with an input/output device. For example, an input device may include a keyboard or a mouse, and an output device may include, for example, a display for displaying a communication session of an application. As another example, the input/output interface may be a unit for interfacing with a device in which various suitable functions for input and output are integrated into one, such as a touch screen.

Figure 3:
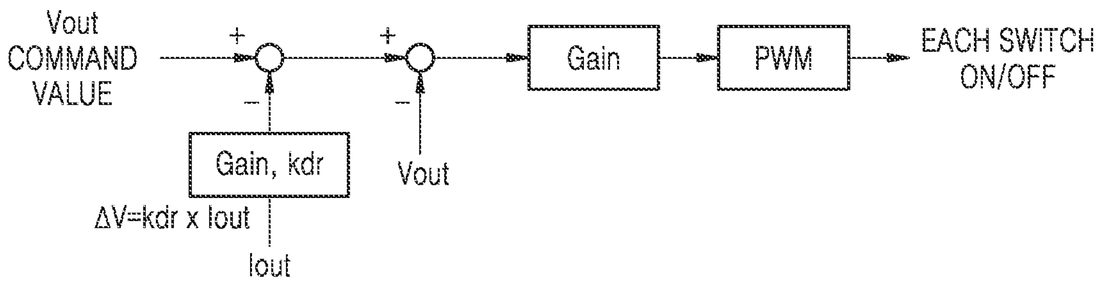
FIG. 3 is a block diagram illustrating a method of controlling a DC-DC converter according to a comparative example.
Figure 4:
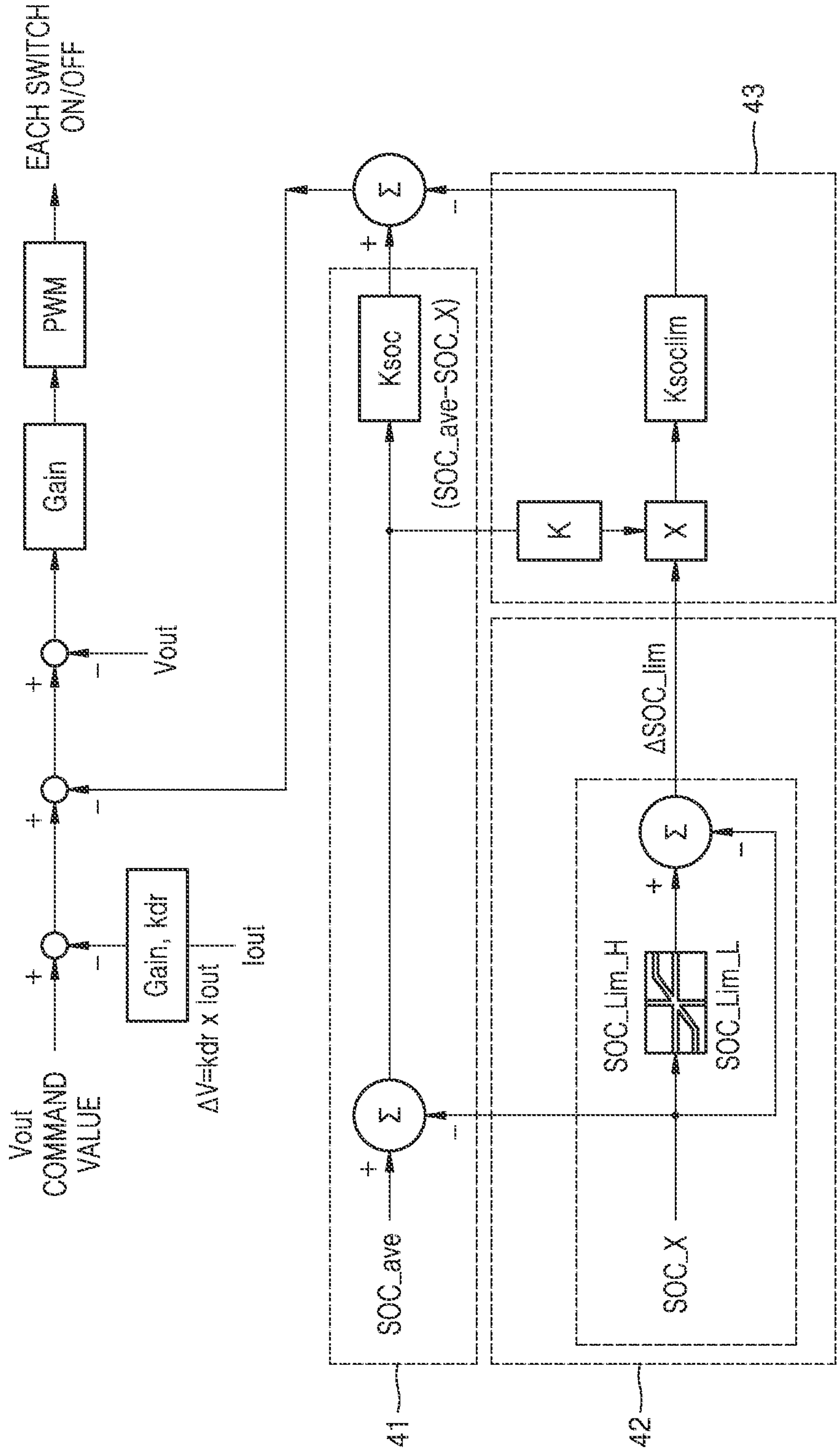
FIGS. 4-5 are block diagrams illustrating a method of controlling a DC-DC converter, according to an embodiment.
Figure 5:
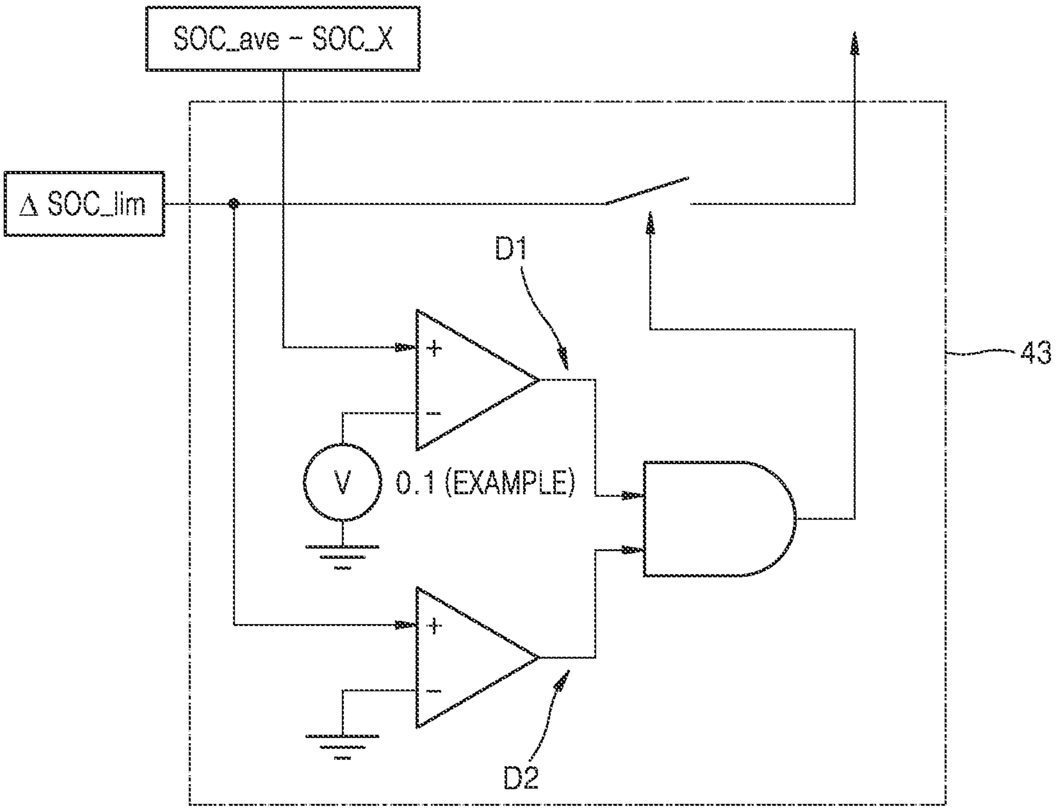

FIG. 3 is a block diagram illustrating a method of controlling a DC-DC converter according to a comparative example. FIGS. 4 and 5 are block diagrams illustrating a method of controlling a DC-DC converter, according to an embodiment.

Referring to FIG. 3, a control block of a DC-DC converter is shown. For example, as shown in FIG. 3, when an output voltage of the DC-DC converter is low, a gain is positively amplified, and an on-pulse width increases according to a pulse width modulation (PWM) process of FIG. 3, thereby, increasing the output voltage. On the other hand, when the output voltage is high, the gain is negatively amplified, and the on-pulse width is narrowed, thereby, reducing the output voltage. For example, when the output voltage that may be obtained is 990 V in a case in which the gain=10, Vout is controlled to 1000 V with no load, and a load of 100 A is connected, a voltage drops by 10 V because a power impedance is about 0.1Ω(e.g., Ri=10V/100 A=0.1Ω). In addition, when a voltage drops by about 20 V when the gain=1, a power impedance of 0.2Ω may exist. As such, in the DC-DC converter, a power impedance (e.g., an internal impedance) exists depending on the control gain and the resistance components in a circuit.

For example, when each of DC-DC converters connected to a plurality of batteries is individually controlled, the same output voltage may not be obtained depending on a power impedance difference, even when output voltage command values Vo are the same as each other (e.g., Vo1=Vo2). Accordingly, the output voltages may be matched with each other by changing the control output voltage command values. For example, referring to FIG. 3, by controlling the control output voltage command values according to {Vout command value−ΔV(=Kdr×Iout)}, the output voltages may be controllably matched with each other. As such, the method of controlling the DC-DC converter shown in FIG. 3 is referred to as Droop control.

FIG. 4 is a block diagram illustrating a method of controlling a DC-DC converter according to an embodiment.

Because the SOC of each battery may not be controlled only by the Droop control method of FIG. 3, an output voltage command value of the DC-DC converter may be controlled based on the SOC of each battery. For example, referring to FIG. 4, the SOC of each of the batteries may be matched with each other by changing the output voltage command value together with the Droop control, and individually controlling a circulating current of the DC-DC converter.

The apparatus for controlling the SOC of a battery, according to an embodiment of the present disclosure, may include one or more of the processors 32 that controls the SOC of a first battery and the SOC of a second battery by calculating the SOC of the first battery and the SOC of the second battery, and controlling the output voltage command values of each of the first DC-DC converter 20 and the second DC-DC converter 21 based on the SOC of the first battery and the SOC of the second battery, respectively.

The processor 32 may include an SOC average control circuit 41, an excess component output circuit 42, and an SOC limit value control circuit 43.

The SOC average control circuit 41 may amplify a difference between an average SOC of the first battery and the second battery and the SOC of the first battery or the SOC of the second battery. For example, as shown in FIG. 4, the SOC average control circuit 41 may change an output voltage Vout command value to match the SOC difference according to an average SOC value of the first battery and the second battery (SOC_ave) minus an SOC value of the first battery or the second battery (SOC_X) (e.g., SOC_ave−SOC_X). For example, SOC_ave is the average SOC value of the first battery and the second battery, and SOC_X is the SOC value of the first battery or the second battery. In addition, referring to FIG. 4, the SOC average control circuit 41 may amplify the difference between the average SOC of the first battery and the second battery and the SOC of the first battery or the SOC of the second battery by K times.

The excess component output circuit 42 may compare the SOC limit values of the first battery and the second battery with the SOC of the first battery or the second battery, and may output an excess value. For example, as shown in FIG. 4, when the SOC of each battery exceeds upper (SOC_Lim_H) and lower (SOC_Lim_L) SOC limit value ranges (SOC_Lim), the excess component output circuit 42 may extract the excess component. For example, because the output value of the excess component output circuit 42 may be equal to zero when the SOC limit value is in the SOC_Lim ranges, the excess component output circuit 42 may operate when the SOC limit value ranges SOC_Lim is exceeded. For example, as shown in FIG. 4, when the excess component may be expressed as ΔSOC_lim, an operation of the excess component output circuit 42 may be expressed by the below equations.

$$SOC\_lim\_L<SOC<SOC\_lim\_H: \Delta SOC\_lim=0$$

$$SOC>SOC\_lim\_H: \Delta SOC\_lim=SOC-SOC\_lim\_H$$

$$SOC<SOC\_lim\_L: \Delta SOC\_lim=SOC-SOC\_lim\_L$$

The SOC limit value control circuit 43 may output a value obtained by multiplying the output value of the excess component output circuit 42 by a signal before amplification of the SOC average control circuit 41. For example, as shown in FIG. 4, the SOC limit value control circuit 43 may output a value obtained by multiplying a value before amplification of the SOC average control circuit 41 by the excess component ΔSOC_lim. For example, when a difference between SOC_ave and the SOC of each battery is large, the SOC limit value control circuit 43 may increase a result value by multiplying the size of a component exceeding the SOC limit value. In addition, when the difference between SOC_ave and the SOC of each battery is small even though the SOC limit value is exceeded, the SOC limit value control circuit 43 may output the result value to be small. For example, as shown in FIG. 4, the K of the SOC limit value control circuit 43 represents an amplification gain.

The apparatus for controlling the SOC of a battery, according to an embodiment of the present disclosure, may calculate the SOCs of the first battery and the second battery by subtracting the difference between the output value of the SOC average control circuit 41 and the output value of the SOC limit value control circuit 43 from the output voltage command values of the first DC-DC converter 20 and the second DC-DC converter 21, respectively.

In an embodiment, the SOC limit value control circuit 43 may include an analog circuit or a digital circuit. For example, FIG. 5 is a block diagram illustrating a method of controlling a DC-DC converter according to an embodiment that is configured in a digital manner. For example, referring to FIG. 5, the SOC limit value control circuit 43 may be implemented in a digital manner, and in an embodiment, may include an AND circuit, a first amplifier having an output connected to a first input terminal of the AND circuit, a second amplifier having an output connected to a second input terminal of the AND circuit, and a switch connected to an output of the AND circuit to be controlled according to the output of the AND circuit.

For example, referring to D1 in FIG. 5, when the SOC difference is less than 0.1%, an input of the AND circuit becomes low, and the switch may be turned off. In addition, referring to D2 in FIG. 5, when SOC_Lim_H/L is not exceeded, an input of the AND circuit becomes low, and the switch may be turned off.

Figure 6:
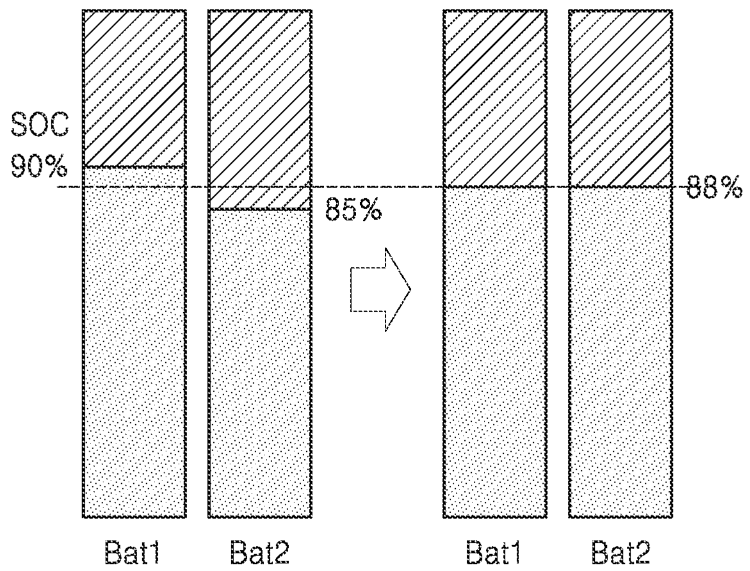
FIGS. 6-8 are diagrams illustrating a method of controlling the SOC of a battery, according to an embodiment.
Figure 7:
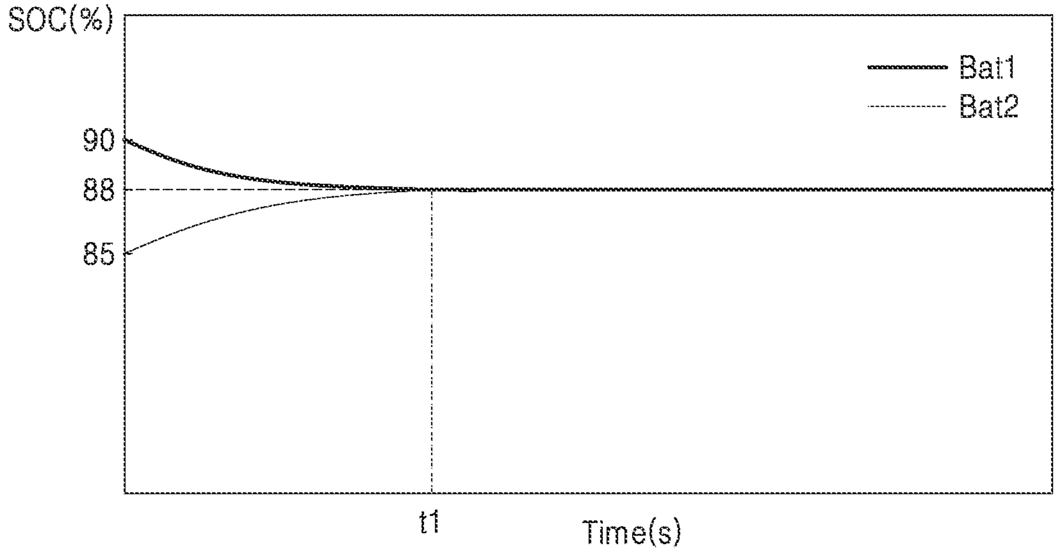
Figure 8:
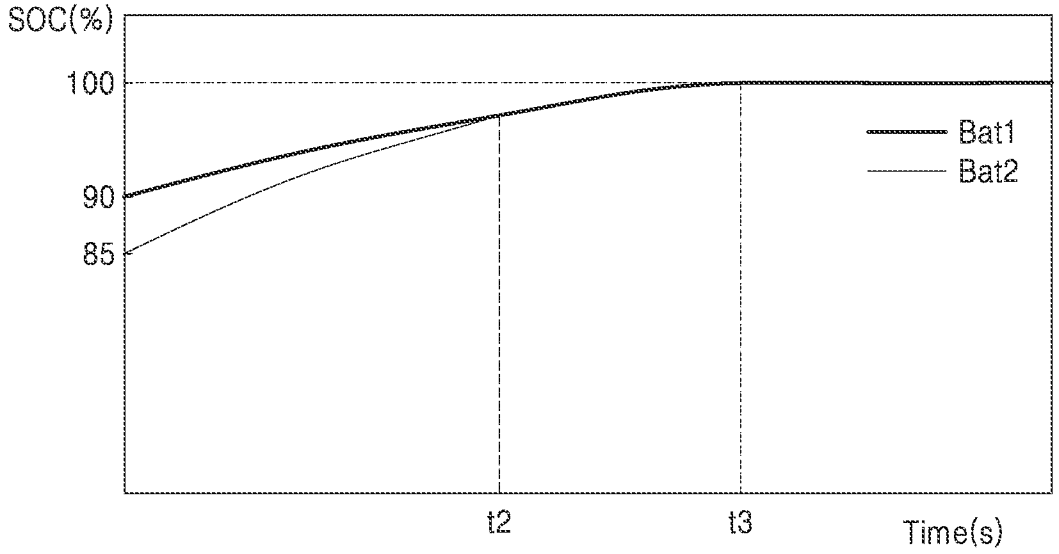

FIGS. 6 through 8 are diagrams illustrating a method of controlling the SOC of a battery, according to an embodiment.

Referring to FIG. 6, in an embodiment, the SOC of a first battery Bat1 may be 90%, and the SOC of a second battery Bat2 may be 85%. In this case, an SOC average value between the SOC of the first battery and the SOC of the second battery may be 88%.

The system BMS 30 may control an output voltage command value of the first DC-DC converter 20 based on the SOC average value of 88% and the SOC of the first battery. In addition, the system BMS 30 may control an output voltage command value of the second DC-DC converter 21 based on the SOC average value of 88% and the SOC of the second battery. For example, as shown in FIG. 6, the SOCs of the first battery Bat1 and the second battery Bat2 may be controlled to the SOC average value of 88%.

Referring to FIGS. 6 and 7 together, at a first time t1, the SOCs of the first battery Bat1 and the second battery Bat2 may be controlled to the SOC average value of 88%.

According to one or more embodiments of the present disclosure, the output voltage command value of the DC-DC converter may be controlled based on the SOC average value and the SOC, and thus, the SOCs of batteries that are arranged in parallel with each other may be uniformly or substantially uniformly controlled, to minimize or reduce the residual energy due to an SOC deviation.

Referring to FIGS. 6 and 8, the apparatus for controlling the SOC of a battery, according to an embodiment, may uniformly or substantially uniformly control the SOC, while charging the battery at the same time. For example, referring to FIG. 8, at a second time t2, the SOCs of the first battery Bat1 and the second battery Bat2 may be equalized or substantially equalized with each other. Because the SOC average control and charging are performed concurrently (e.g., simultaneously or substantially simultaneously) with each other, the SOC at which the SOCs of the first battery Bat1 and the second battery Bat2 are equalized or substantially equalized with each other may be a value of 88% or more, which is the SOC average value. In addition, at a third time t3, the first battery Bat1 and the second battery Bat2 may be fully charged.

According to one or more embodiments of the present disclosure, in the batteries that are arranged in parallel with each other, the remaining energy capacity thereof due to the SOC deviation may be minimized or reduced by equalizing or substantially equalizing the SOC of each of the batteries with one another.

FIGS. 9 through 12 are diagrams illustrating a method of controlling the SOC of a battery, according to another embodiment.

Figure 9:
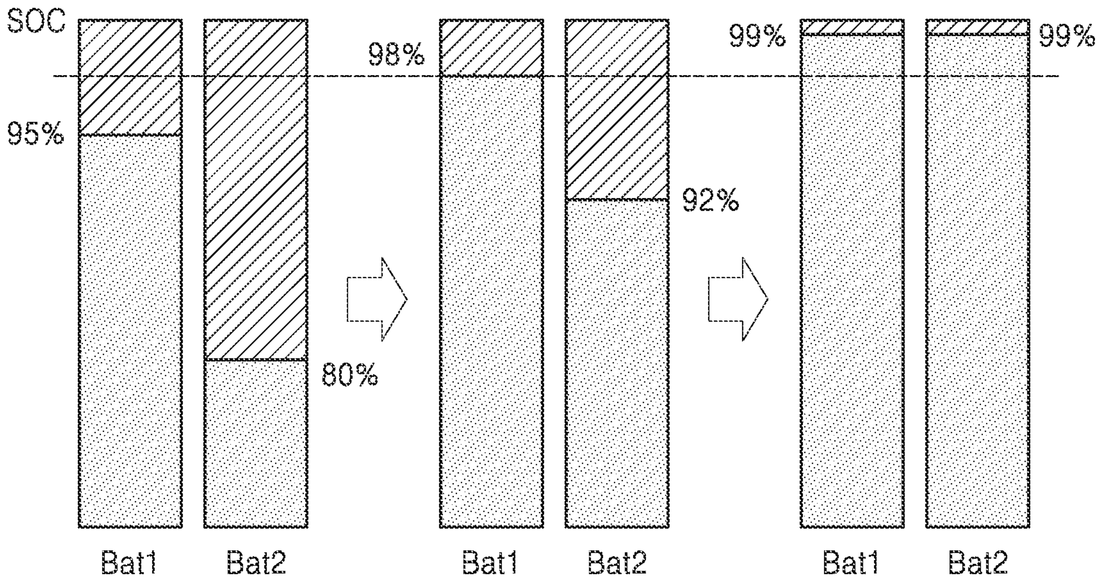
FIGS. 9-12 are diagrams illustrating a method of controlling the SOC of a battery, according to another embodiment.

Referring to FIG. 9, in an embodiment, the SOC of a first battery Bat1 may be 95%, and the SOC of a second battery Bat2 may be 80%. In this case, an SOC average value between the SOC of the first battery and the SOC of the second battery may be 88%. In addition, a first difference between the SOC of the first battery and the SOC average value may be 7%, and a second difference between the SOC of the second battery and the SOC average value may be 8%.

An SOC limit value according to an embodiment may be determined (e.g., may be set) to a value having a suitable numerical value (e.g., a predetermined or particular numerical value). For example, the SOC limit value may be determined to be 95%.

Figure 10:
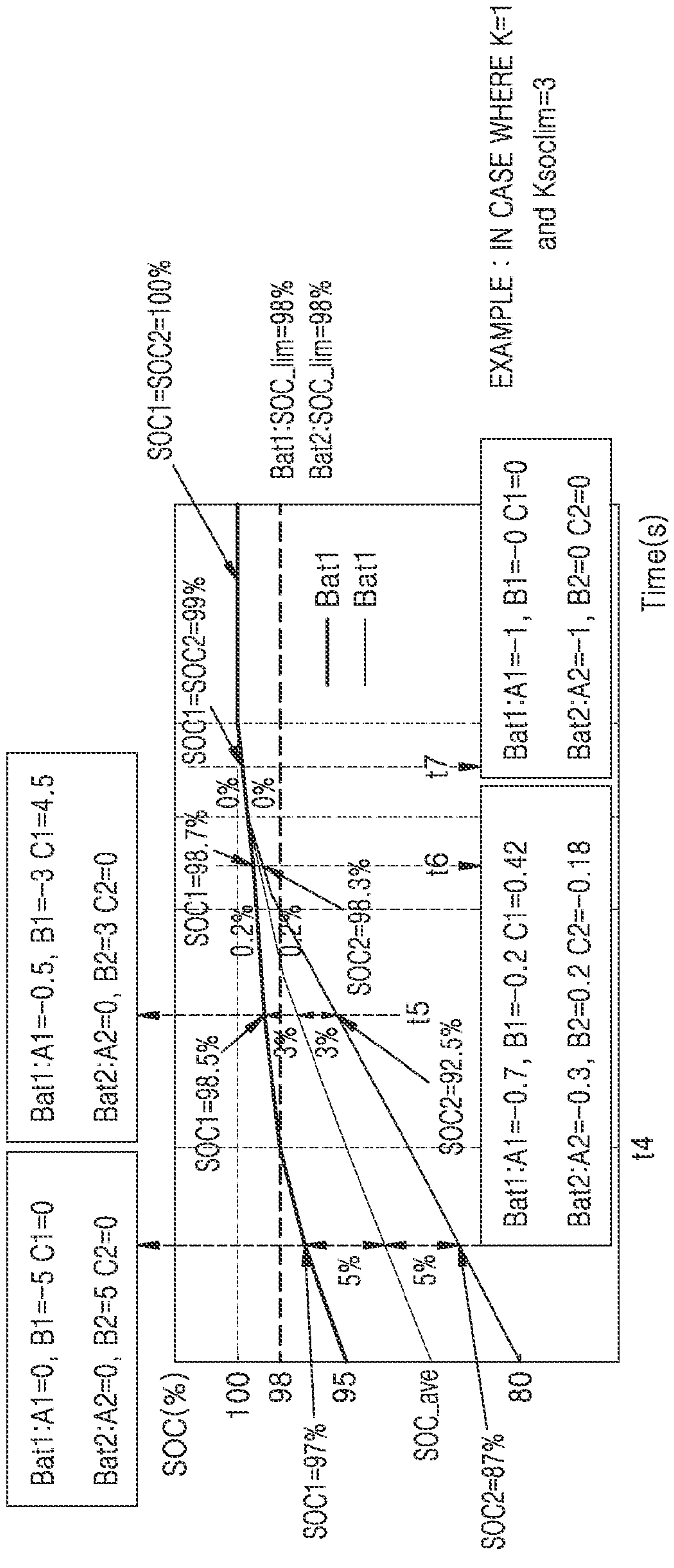
Figure 11:
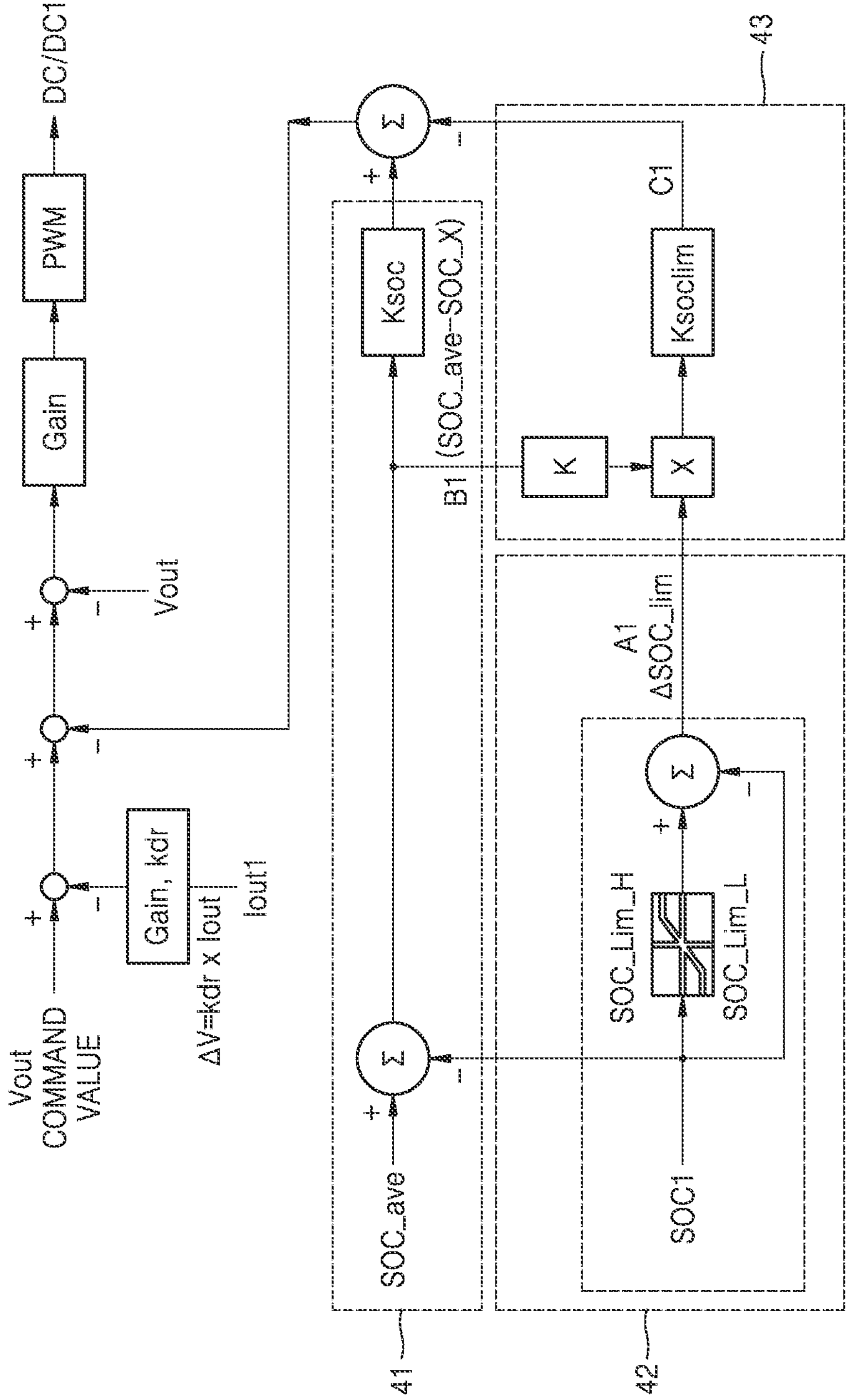
Figure 12:
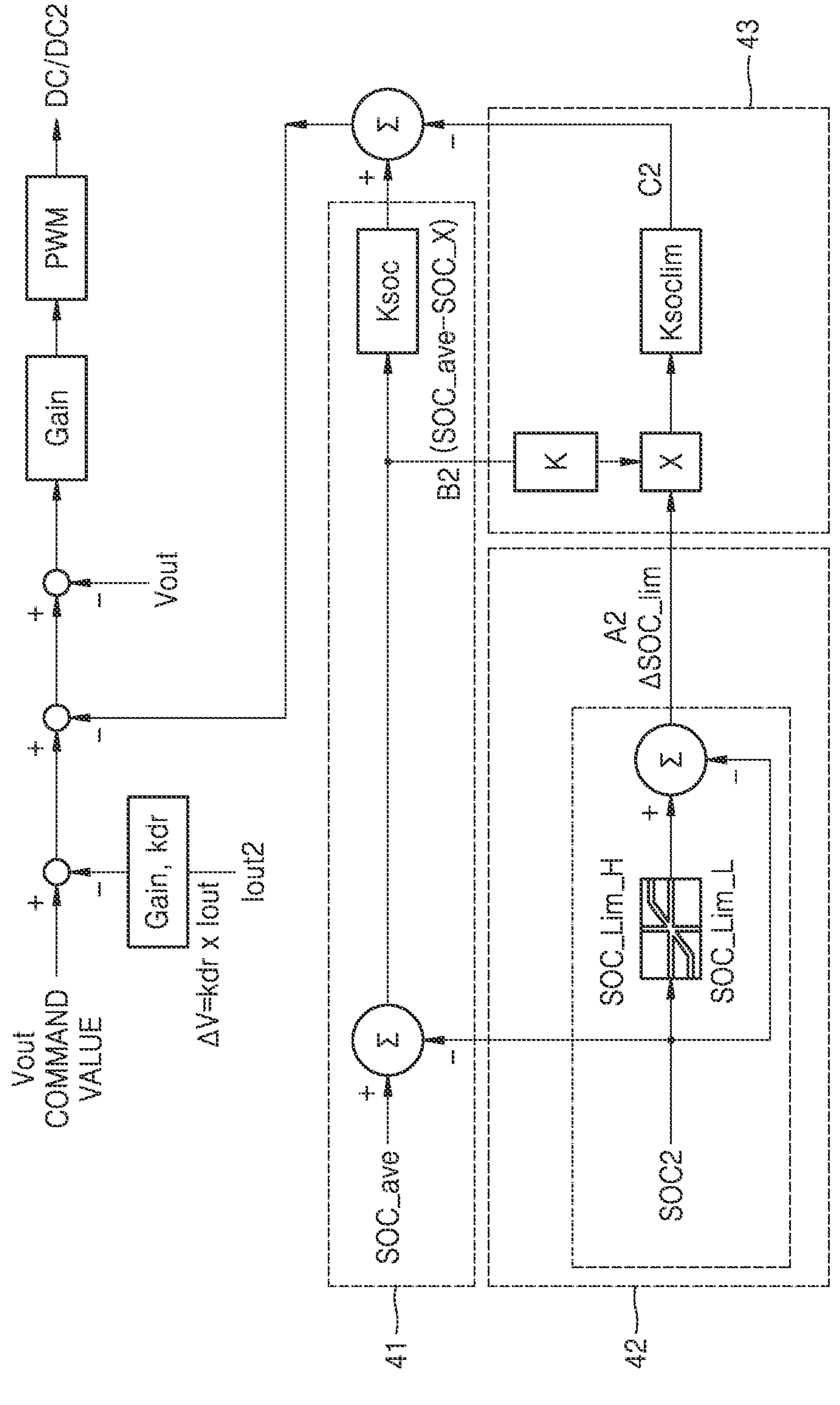

FIG. 10 illustrates the SOC of each battery by time, and FIGS. 11 and 12 each illustrates a control block diagram of a DC-DC converter. For example, FIGS. 10 to 12 illustrate embodiments in which a gain K of the SOC limit value control circuit 43 is 1, and a Ksoclim is 3. In addition, the SOC limit for each battery is shown as 98%.

FIG. 10 illustrates the SOC and the SOC average of each battery according to time.

Referring to FIGS. 10 through 12 together, in a period from time 0 to t4, SOC average control may be performed to control the first DC-DC converter 20 and the second DC-DC converter 21. For example, when the SOC (e.g., SOC1) of the first battery 10 (e.g., Bat1) is 97%, the SOC (e.g., SOC2) of the second battery 11 (e.g., Bat2) may be 87%, and the difference between the SOC average and each SOC may be 5%. In this case, in FIGS. 11 and 12, for the first battery 10 (e.g., Bat1), A1=0, B1=−5, and C1=0, and for the second battery 11 (e.g., Bat2), A2=0, B2=5, and C2=0.

In a period of time from t4 to t5, the SOC average control may be performed in the control of the first DC-DC converter 20 and the second DC-DC converter 21. In addition, SOC threshold control may be performed in the control of the first DC-DC converter 20. For example, when the SOC of the first battery 10 is 98.5%, the SOC of the second battery 11 may be 92.5%, and the difference between the SOC average and each SOC may be 3%. In this case, in FIGS. 11 and 12, for the first battery 10 (e.g., Bat1), A1=−0.5, B1=−3, and C1=4.5, and for the second battery 11 (e.g., Bat2), A2=0, B2=3, and C2=0.

In a period of time from t5 to t6, SOC average control and SOC threshold control may be performed in the control of the first DC-DC converter 20 and the second DC-DC converter 21. For example, when the SOC of the first battery 10 is 98.7%, the SOC of the second battery 11 may be 98.3%, and the difference between the SOC average and each SOC may be 0.2%. In this case, in FIGS. 11 and 12, for the first battery 10 (e.g., Bat1), A1=−0.7, B1=−0.2, and C1=0.42, and for the second battery 11 (e.g., Bat2), A2=−0.3, B2=0.2, and C2=−0.18.

In a period of time from t6 to t7, the SOCs of the first battery 10 and the second battery 11 may be matched to 99%. In this case, the difference between the SOC average and each SOC is 0%, and in FIGS. 11 and 12, for the first battery 10 (e.g., Bat1), A1=−1, B1=0, and C1=0, and for the second battery 11 (e.g., Bat2), A2=−1, B2=0, C2=0. Also, the first battery 10 and the second battery 11 may be fully charged together.

According to one or more embodiments of the present disclosure, the capacity usage of batteries that are arranged in parallel with each other may be maximized or improved, by minimizing or reducing the SOC deviation of each of the batteries that are connected in parallel with each other at the end of charging and discharging by using the SOC average control and the SOC threshold control.

The SOC of each of batteries that are connected in parallel with each other may be equalized or substantially equalized with each other, so that the remaining energy capacity due to the SOC deviation at the end of charging and discharging may be minimized or reduced. In addition, the SOC of each of the batteries may be controlled to be the same or substantially the same as each other, even when a deteriorated battery or a different type of battery is included from among the plurality of batteries that are connected in parallel with each other.

In addition, in the case where some of the batteries are removed from the entire battery system due to maintenance or the like, when the SOC difference is large during recovery, charging/discharging may be terminated with the SOC difference before sufficient response, even when SOC average control is performed. However, according to one or more embodiments of the present disclosure, even when the SOC is not uniform, the charge/discharge amount of a battery that has reached an SOC limit may be suppressed, until it becomes the same or substantially the same as (e.g., almost the same as) those of other batteries, and thus, the capacity of the batteries that are arranged in parallel with each other may be increased (e.g., may be used to the maximum) by using the batteries as they are, even when the SOC deviation is large at the time of maintenance return.

When there is no threshold control function, it may be necessary to make and operate the same SOC for each battery in advance, and the amount of adjustment work and time needed before operation starts may be increased. According to one or more embodiments of the present disclosure, recovery time may be shortened by using the SOC threshold control function.

The various embodiments described above are provided as examples, and may not need to be performed independently of each other. For example, the embodiments described in the present disclosure may be implemented in combination with each other.

The various embodiments described above may be implemented in the form of a computer program that may be executed through various components on a computer, and the computer program may be recorded in a computer-readable medium. The medium may be to continuously store a program executable by the computer, or to temporarily store the program for execution or download. In addition, the medium may be various suitable recording units (e.g., recording devices) or storage units (e.g., storage devices) in the form of a single or several hardware that are combined with each other, which is not limited to a medium directly connected to any computer system, and may exist as being distributed on a network. As an example of the medium, the medium may be configured to store program instructions by including a hard disk, a magnetic medium, such as a floppy disk and a magnetic tape, an optical recording medium, such as Compact Disc (CD)-ROM and digital versatile disc (DVD), a magneto-optical medium, such as a floptical disk, and ROM, RAM, flash memory, or the like. In addition, as another example of the medium, the medium may also include a recording medium or storage medium managed by an application store that distributes applications, sites that supply or distribute various other software, and servers, or the like.

As used in the present disclosure, the terms "unit", "module", or the like may be a hardware component, such as a processor or circuit, and/or a software component executed by a hardware component such as a processor. For example, the "unit", "module", or the like may be implemented by various suitable components, such as software components, object-oriented software components, class components, and task components, and processes, functions, properties, procedures, subroutines, segments of program code, drivers, firmware, microcode, circuitry, data, databases, data structures, tables, arrays, and/or variables.

According to one or more embodiments of the present disclosure, the usage capacity of batteries that are arranged in parallel with each other may be maximized or improved by minimizing or reducing the residual energy due to the SOC deviation of the batteries by effectively controlling the SOC of the batteries. However, the aspects and features of the present disclosure are not limited thereto.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A method of controlling state of charge (SOC) of a first battery and a second battery that are connected in parallel with each other, the method comprising:

calculating the SOC of the first battery and the SOC of the second battery;

controlling output voltage command values of a first direct current (DC-DC) converter and a second DC-DC converter based on the SOC of the first battery and the SOC of the second battery, the first DC-DC converter and the second DC-DC converter being connected to ends of the first battery and the second battery, respectively; and controlling the SOC of the first battery and the SOC of the second battery to match each other based on the controlling of the output voltage command values of the first DC-DC converter and the second DC-DC converter, wherein the controlling of the SOC of the first battery and the SOC of the second battery comprises:

performing an SOC average control operation by amplifying a difference between an average SOC of the first battery and the second battery and the SOC of the first battery or the SOC of the second battery; and performing an excess component output operation to output an excess value by comparing an SOC limit value of the first battery and the second battery with the SOC of the first battery or the second battery, and wherein the controlling of the SOC of the first battery and the SOC of the second battery further comprises performing an SOC limit value control operation by outputting a value obtained by multiplying the excess value output by the excess component output operation by a signal before amplification by the SOC average control operation.

2. The method of claim 1, wherein the SOC limit value control operation is performed by controlling an analog circuit or a digital circuit.

3. The method of claim 1, wherein the controlling of the SOC of the first battery and the SOC of the second battery further comprises controlling the SOCs of the first battery and the second battery by subtracting a difference between an output value of the SOC average control operation and the SOC limit value by output voltage command values of the first DC-DC converter and the second DC-DC converter, respectively.

4. A recording medium comprising a computer program stored thereon for executing the method of claim 1 on a computer device.

5. An apparatus for controlling a state of charge (SOC) of a battery, comprising:

a processor; and memory comprising instructions that, when executed by the processor, cause the processor to:

calculate the SOC of a first battery and the SOC of a second battery that are connected in parallel with each other; and control output voltage command values of a first direct current (DC-DC) converter and a second DC-DC converter based on the SOC of the first battery and the SOC of the second battery, respectively, the first DC-DC converter and the second DC-DC converter being electrically connected to ends of the first battery and the second battery, respectively, wherein the SOC of the first battery and the SOC of the second battery are controlled to match each other based on the controlled output voltage command values of the first DC-DC converter and the second DC-DC converter, wherein the processor comprises:

an SOC average control circuit configured to amplify a difference between an average SOC of the first battery and the second battery and the SOC of the first battery or the SOC of the second battery; and an excess component output circuit configured to compare an SOC limit value of the first battery and the second battery with the SOC of the first battery or the second battery to output an excess value, and wherein the processor further comprises an SOC limit value control circuit configured to output a value obtained by multiplying the excess value output by the excess component output circuit by a signal before amplification by the SOC average control circuit.

6. The apparatus of claim 5, wherein the SOC limit value control circuit comprises an analog circuit or a digital circuit.

7. The apparatus of claim 5, wherein the instructions further cause the processor to control the SOCs of the first battery and the second battery by subtracting a difference between an output value of the SOC average control circuit and the output value of the SOC limit value control circuit by the controlled output voltage command values of the first DC-DC converter and the second DC-DC converter, respectively.

* * * * *